US010842006B2

(12) United States Patent
Louh et al.

(10) Patent No.: US 10,842,006 B2
(45) Date of Patent: Nov. 17, 2020

(54) LIGHTING DEVICE WITH SLOT ANTENNA

(71) Applicant: SIGNIFY HOLDING B.V., Eindhoven (NL)

(72) Inventors: Yacouba Louh, Eindhoven (NL); Henricus Mathijs Maria Creemers, Eindhoven (NL); Jaco Van Der Merwe, Eindhoven (NL); Dirk Jan Van Kaathoven, Eindhoven (NL); Peter Rijskamp, Eindhoven (NL); Berend Jan Willem Ter Weeme, Eindhoven (NL); Peter Johannes Martinus Bukkems, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/489,417

(22) PCT Filed: Feb. 19, 2018

(86) PCT No.: PCT/EP2018/053978
§ 371 (c)(1),
(2) Date: Aug. 28, 2019

(87) PCT Pub. No.: WO2018/158096
PCT Pub. Date: Sep. 7, 2018

(65) Prior Publication Data
US 2020/0015340 A1    Jan. 9, 2020

(30) Foreign Application Priority Data

Mar. 1, 2017 (EP) .................................... 17158725

(51) Int. Cl.
*F21V 21/00* (2006.01)
*H05B 47/19* (2020.01)
(Continued)

(52) U.S. Cl.
CPC ............. *H05B 47/19* (2020.01); *F21K 9/232* (2016.08); *F21K 9/238* (2016.08); *F21V 23/006* (2013.01);
(Continued)

(58) Field of Classification Search
CPC ......... H05B 47/19; F21K 9/238; F21K 9/232; F21V 23/006; F21V 23/0435; H01Q 1/44; H01Q 13/18; H01Q 1/22
(Continued)

(56) References Cited

U.S. PATENT DOCUMENTS 8,981,646 B2 * 3/2015 Kim ........................ F21V 11/00
315/34
2005/0088354 A1    4/2005 Chang
(Continued)

FOREIGN PATENT DOCUMENTS

EP          879485 B1   12/2001
JP       2012-142893 A    7/2012
(Continued)

*Primary Examiner* — Laura K Tso
(74) *Attorney, Agent, or Firm* — Akarsh P. Belagodu

(57) ABSTRACT

A lighting device (1) is disclosed. The lighting device (1) comprises: a communication unit (10) for wireless communication between the lighting device (1) and an external device; a solid-state lighting element (3) electrically connected to the communication unit (10); a heat sink (5) in thermal contact with the solid-state lighting element (3), the heat sink (5) having a slot (5a) adapted to act as a slot antenna; and a feed antenna (11) electrically connected to the communication unit (10), the feed antenna (11) having at least one end tip arranged at the slot (5 a) so as to enable the feed antenna (11) and the slot (5a) to communicate by proximity coupling.

12 Claims, 3 Drawing Sheets

(51) Int. Cl.

| | |
|---|---|
| *F21K 9/238* | (2016.01) |
| *F21K 9/232* | (2016.01) |
| *F21V 23/00* | (2015.01) |
| *F21V 23/04* | (2006.01) |
| *H01Q 1/44* | (2006.01) |
| *H01Q 13/18* | (2006.01) |
| *H01Q 1/22* | (2006.01) |

(52) U.S. Cl.
CPC ........... *F21V 23/0435* (2013.01); *H01Q 1/44* (2013.01); *H01Q 13/18* (2013.01); *H01Q 1/22* (2013.01)

(58) Field of Classification Search
USPC ..................................................... 362/249.01
See application file for complete search history.

(56) References Cited

U.S. PATENT DOCUMENTS

| | | | |
|---|---|---|---|
| 2006/0023575 A1 | 2/2006 | Hayashi et al. | |
| 2010/0231474 A1 | 9/2010 | Yamagajo et al. | |
| 2014/0218913 A1 | 8/2014 | Cozzolino et al. | |
| 2015/0345764 A1 | 12/2015 | Hussey et al. | |
| 2016/0072176 A1 | 3/2016 | Van Dijk et al. | |
| 2016/0135270 A1* | 5/2016 | Earl ..................... | F21K 9/238 315/297 |
| 2016/0183353 A1 | 6/2016 | Louh et al. | |

FOREIGN PATENT DOCUMENTS

| | | |
|---|---|---|
| JP | 2016-530681 A | 9/2016 |
| WO | 2009/069199 A1 | 6/2009 |
| WO | 2016001367 A1 | 1/2016 |

\* cited by examiner

LIGHTING DEVICE WITH SLOT ANTENNA

CROSS-REFERENCE TO PRIOR APPLICATIONS

This application is the U.S. National Phase application under 35 U.S.C. § 371 of International Application No. PCT/EP2018/053978, filed on Feb. 19, 2018, which claims the benefit of European Patent Application No. 17158725.6, filed on Mar. 1, 2017. These applications are hereby incorporated by reference herein.

FIELD OF THE INVENTION

The present invention relates to a wirelessly controllable lighting device having a slot antenna.

BACKGROUND OF THE INVENTION

Lighting devices that are wirelessly controllable are known in the art. An example of such a lighting device is disclosed in US 2016/0072176 A1. That lighting device has a heat spreader for the light-emitting diodes with a slot that acts as a slot antenna, and the slot is feed by a feed line which is coplanar with the slot and crosses the slot at right angles (see FIG. 8a of US 2016/0072176 A1). Wireless signals may be used to switch the power on/off, adjust the illumination intensity, change the lighting color or control the operation of the light bulb in some other way.

While the lighting device of US 2016/0072176 A1, and similar wirelessly controllable lighting devices, are suitable for their intended use, they are subject to improvement. For example, it would be desirable to improve the feeding of the slot antenna.

SUMMARY OF THE INVENTION

It would be desirable to provide an improved or alternative lighting device. To better address this concern, there is presented a lighting device comprising: a communication unit for wireless communication between the lighting device and an external device; a solid-state lighting element electrically connected to the communication unit; a heat sink in thermal contact with the solid-state lighting element, the heat sink having a slot adapted to act as a slot antenna; and a feed antenna electrically connected to the communication unit, the feed antenna having at least one end tip arranged at the slot so as to enable the feed antenna and the slot to communicate by proximity coupling.

By the end tip being arranged "at" the slot is meant that the end tip is arranged so close to the slot that the slot is influenced by the electric fringing fields generated at the tip and coupled to the feed antenna by proximity coupling.

Arranging the end tip as described above enables the feed antenna to be particularly efficiently coupled to the slot, something which helps to improve the power efficiency of the feeding, during transmission as well as reception. The efficient coupling is achieved without the feed antenna and the heat sink being arranged in a way that sacrifices robustness, thermal performance, optical performance and/or aesthetics to any significant degree. Moreover, the efficient coupling can be achieved even in situations where the amount of available space inside the lighting device is particularly limited.

Further, unlike the often-used transmission line feed method, the feeding technique of the present invention works well even if the slot is arranged in a curved surface of the heat sink. The transmission line feed method also requires the circuit board with the line feed to be coplanar with the surface containing the slot, something which the feeding technique of the present invention does not require.

Still further, the lighting device described above can be produced in a cost-efficient way using simple and fast manufacturing techniques that are suitable for mass production.

The heat sink may be cylindrical. Such a heat sink can have a large outer surface area that transfers heat towards the ambient air. Also, if the heat sink has the shape of a hollow cylinder, the feed antenna can typically be arranged inside the heat sink, where it is hidden from view and does not interfere with the light emitted by the SSL element.

At least a portion of the feed antenna may be curved and include the at least one end tip.

The above-mentioned portion of the feed antenna may be arranged along a curved inner side wall of the cylindrical heat sink.

The at least one end tip may be situated in an imaginary sector defined by a central longitudinal axis of the cylindrical heat sink and 100%-125% of the width of the slot. Arranging the end tip in such a way typically results in effective coupling between the end tip and the slot.

The above-mentioned portion of the feed antenna may be arranged so as not to cross the slot.

The lighting device may comprise a circuit board, and the feed antenna may be printed on two opposite sides of the circuit board. With such a feed antenna it is possible to increase the overlap between the slot and the fringing fields generated by the feed antenna. This reduces feed antenna's sensitivity to detuning caused by the circuit board not being positioned optimally (due to for example production tolerances).

The feed antenna may be a monopole antenna, for example a whip antenna, a planar inverted-F antenna (PIFA) or an inverted-F antenna. Monopole antennas are particularly easy to implement, and they can also be relatively small and therefore particularly suitable when space requirements are especially tight.

The circuit board may comprise a ground plane, and the slot may be aligned with a gap between the end tip of the monopole antenna and the ground plane.

The feed antenna may be a dipole antenna. Dipole antennas can be particularly efficient and can generate a strong radiation field.

The feed antenna may have two end tips, and the slot may be aligned with a gap between the two end tips. Arranging the end tips in such a way typically results in strong coupling between the end tips and the slot. Further, a particularly strong electric field can be generated between end tips with respective voltages that are 180 degrees out of phase. The complete slot may be provided in a curved side wall of the cylindrical heat sink.

The slot may be L-shaped. In principle, the slot may have any shape. However, the size and position of the slot affect the thermal performance and the mechanical strength of the het sink, and the inventors have found that an L-shaped slot can, without the heat sink becoming complicated or time consuming to produce, be positioned so that the thermal and mechanical properties of the heat sink are not affected negatively to any significant degree (compared to a heat sink without a slot).

The lighting device may comprise a connector for mechanically and electrically connecting the lighting device to a light socket, and a bottom of the L-shaped slot may be proximal to the connector. This is a particularly advantageous way of positioning the slot as it may help to maximize thermal performance and mechanical strength of the heat sink.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
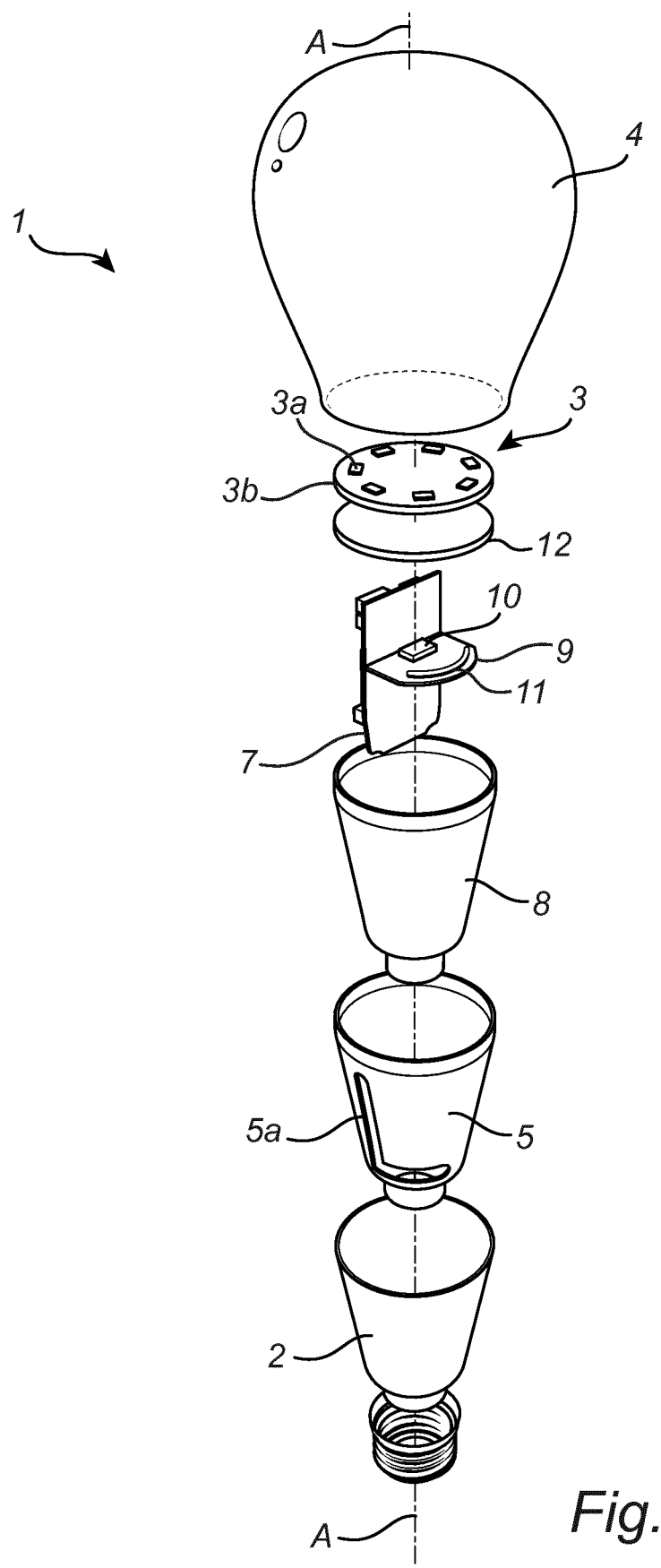
FIG. 1 shows a schematic exploded view of a lighting device according to an example embodiment of the invention.
Figure 2:
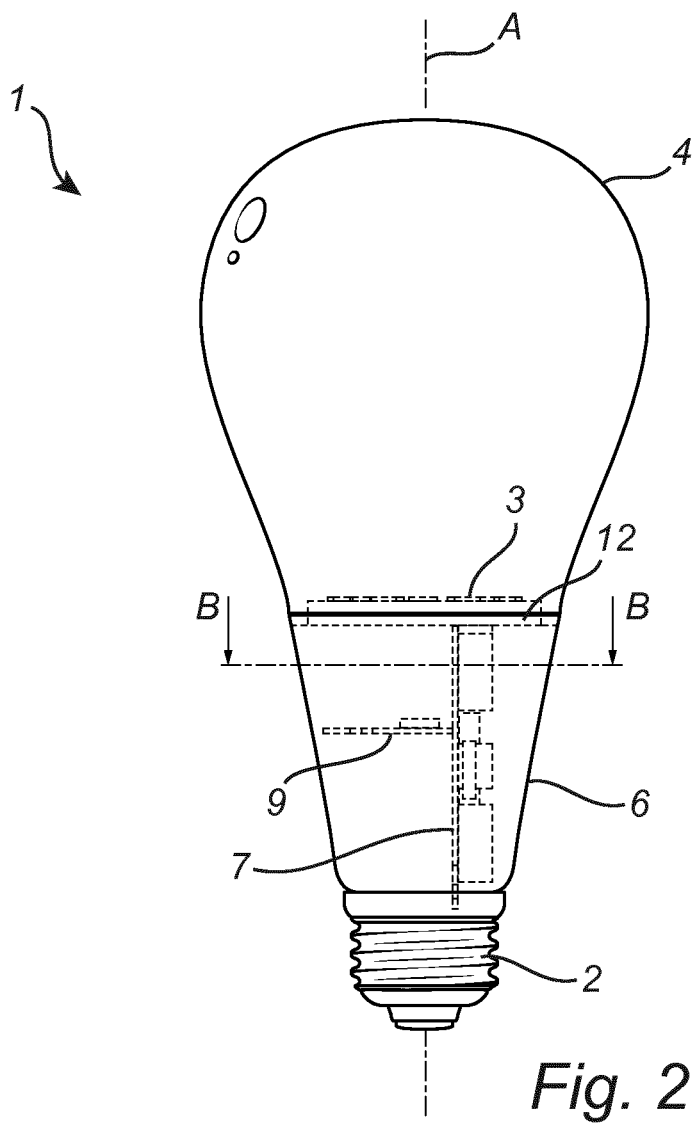
FIG. 2 shows a side view of the lighting device in FIG. 1.
Figure 3:
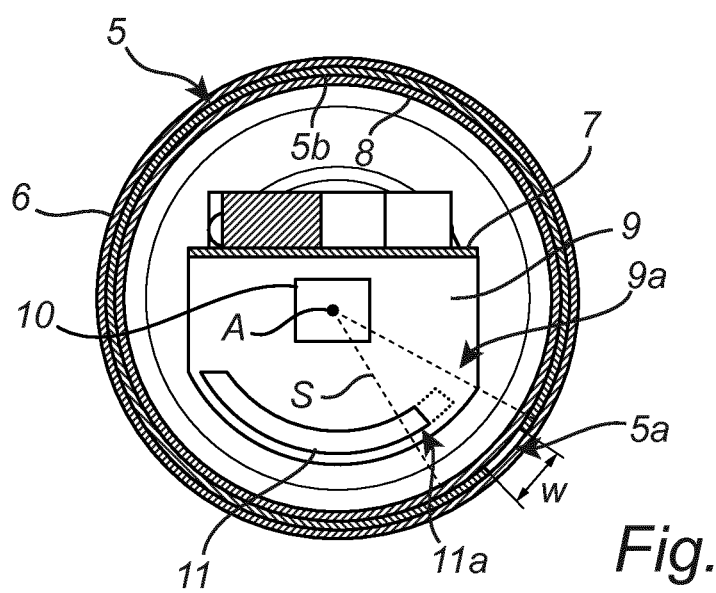
FIG. 3 shows a top view along the line B-B in FIG. 2

FIGS. 1, 2 and 3 show a lighting device 1 in the form of a light bulb. The lighting device 1 has a central longitudinal axis A. The distribution of light emitted by the lighting device 1 is in the illustrated example approximately rotationally symmetric around the central axis A. A connector 2 for mechanically and electrically connecting the lighting device 1 to a light bulb socket forms an end of the lighting device 1. In FIG. 1 the lighting device 1 is positioned so that the central axis A is parallel to the vertical and the connector 2 is at the bottom. The connector 2 is here an Edison screw socket, but in other examples the connector 2 may be some other type of connector, such as a USB connector, a bayonet connector or a pin connector (like in Mr16 and Gu10 lamps, for instance).

The lighting device 1 further comprises a solid-state lighting (SSL) element 3 with one or more solid-state light sources 3a. In the illustrated example, there are several the solid-state light sources 3a in the form of light-emitting diodes (LEDs), such as semiconductor LEDs, organic LEDs or polymer LEDs. All of the LEDs 3a may be configured to emit light of the same color, for example white light, or different LEDs may be configured to emit light of different colors. The LEDs 3a are mounted on an LED board 3b which in this case is a printed circuit board, but other types of circuit boards, such as wired circuit boards, could be used. In the illustrated example, the LEDs 3a are arranged in a circle centered on the central axis A. The LEDs 3a may be arranged differently in another example, such as in a rectangular pattern. The general direction of illumination of the LEDs 3a is here away from the connector 2 in the axial direction, but the LEDs 3a could be arranged so that the general direction of illumination is in some other direction, such as perpendicular to the central axis A.

A light-transmissive member 4 covers the SSL element 3. The member 4 can for example be made of an at least partly transparent plastic material or glass. In the illustrated example, the member 4 has a bulb-like shape that is rotationally symmetric with respect to the central axis A. The member 4 forms an end of the lighting device 1, the end formed by the member 4 and the end formed by the connector 2 being oppositely arranged along the central axis A.

The SSL element 3 is in thermal contact with a heat sink 5 which is adapted to transfer heat away from the SSL element 5 and to the surrounding air. The SSL element 3 and the heat sink 5 are in the illustrated example thermally connected via a heat spreader 12 arranged substantially perpendicularly to the central axis A between the SSL element 3a and the vertical top of the heat sink 5. The heat spreader 12 is in the illustrated example a plate, typically 1 mm to 2 mm thick. The plate 12 may have a vertical edge, for example approximately 5 mm long, that is pressed into the heat sink 5 so that the plate 12 and the heat sink 5 are fixed to each other.

The heat sink 5 is made of a material that is thermally conductive and electrically conductive, such as aluminum or some other metal. The heat sink 5 is arranged along the central axis A which forms a central longitudinal axis of the heat sink 5. In the illustrated example, the heat sink 5 has a hollow cylindrical shape. The illustrated heat sink 5 is also slightly flared, the wide end being proximal to the SSL element 3 and the narrow end being proximal to the connector 2. The thickness of the heat sink 5 depends on the thermal performance required by the application, but is usually in the range from 0.4 mm or 1.2 mm. The heat sink 5 can be for example be produced by a process that includes deep drawing.

The heat sink 5 is provided with a slot 5a formed by an aperture that passes through the heat sink 5. That is to say, the aperture forming the slot 5a passes from the inner surface of the heat sink, i.e. the surface that faces the central axis A, to the outer surface of the heat sink, i.e. the surface that faces away from the central axis A. It is often possible to cut the slot 5a in the heat sink 5 using the same tools that are used for producing the heat sink 5a. For example, when the heat sink 5 is produced by a process that includes using a progressive stamping die or a transfer press, the slot 5a can be cut using the same machine that is used for forming the heat sink 5. This means that it is possible to provide the heat sink 5 with the slot 5a with very little increase in production time.

The slot 5a has here the shape of a capital L. One of the legs of the L-shape, namely the "bottom" of the L-shape, is proximal to the connector 2 and extends generally horizontally in FIG. 1. The other leg of the L shape extends generally vertically in FIG. 1. As can be seen in FIG. 1, the complete L-shaped slot 5a is provided in the curved side wall of the heat sink 5. It should be noted that the position of the horizontal portion of the slot 5a influences the thermal performance of the heat sink 5. The design of the top portion of the heat sink 5a, i.e. the portion close to the LEDs 3a, is paramount for a good heat transfer towards the whole surface area of the heat sink 5. The inventors have found that any slots in the top side of the heat sink 5 should preferably be avoided and that arranging the slot 5a primarily in the vertically lower portion of the heat sink 5 is preferable in order to maximize thermal performance. Further, it should be noted that removing a portion of the heat sink 5 may reduce its mechanical strength, something which could result in unwanted deformations during production. The inventors have found that positioning the horizontal portion of the slot 5a close to the vertically lower portion of the heat sink 5 is particularly advantageous from the point of view of mechanical strength.

The slot 5a is adapted to act as a slot antenna, so the heat sink 5 serves two purposes, namely that of a radiating element and that of a heat sink. The size of the slot 5a is chosen so that the slot 5a is capable of resonating at the desired frequency. Typically, the perimeter of the slot 5a has a length l which is equal to, or approximately equal to, c/(f), where c is the speed of light and f is the desired fundamental resonance frequency of the slot 5a. In many applications, it is desirable that the slot 5a be adapted to have a fundamental resonance frequency in the range from approximately 2.3 GHz to approximately 2.5 GHz, for example 2.4 GHz. From a thermal performance standpoint, it is desirable that the slot 5a be narrow. Further, the width w of the slot 5a is typically chosen to be small compared with the wavelength, usually in the range from 1 mm to 4 mm. It should be noted that, when the slot width w is in this range, the fact that there is no metal (i.e. the heat sink) behind a portion of the plastic (i.e. the housing 6, further discussed below) has only a negligible negative impact on thermal performance.

A housing 6 is arranged on the outer surface of the heat sink 5, i.e. the side of the heat sink 4 that faces away from the central axis A. The housing 6 reduces the risk of a user burning his or her hands when touching the lighting device 1 and also the risk of electric shock. The housing 6 is in this case made of a plastic material with a low carbon content (as the carbon may disturb the reception and transmission of signals). Example of suitable housing materials include polycarbonate and polyethylene. The housing 6 is usually made separate from the heat sink 5 and then put around the heat sink 5, rather than over molded onto the heat sink 5. The inventors have found that this facilitates the provision of a housing 6 that has a thin wall with little variation in thickness and an aesthetically pleasing smooth outer surface. It also helps to reduce problems due to shrinkage and simplifies the manufacturing of the housing 6 in several ways. For example, when over molding is used there is a risk that the housing material flows through the slot 5a, something which may cause thickness variations in the housing 6 and undesirable antenna behavior.

A driver board 7, in this example a printed circuit board, is arranged inside the heat sink 5. That is to say, the driver board 7 is arranged in the interior space defined by the hollow heat sink 5. The driver board 7 is substantially parallel with the central axis A. An isolation part 8, which typically is made of a plastic material, is arranged between the heat sink 5 and the circuit board 7 so as to galvanically isolate the circuit board 7 from the heat sink 5. The driver board 7 comprises electrical circuitry electrically connected to the connector 2 and configured to power the SSL element 3.

The lighting device 1 further comprises a circuit board 9, typically a printed circuit board, which is arranged inside the heat sink 5 substantially perpendicularly to the central axis A. The vertical position of the circuit board 9 (as seen in FIG. 1) is in this case such that the circuit board 9 is located at a position such that the end tip 11a of the feed antenna 11 (further described below) is slightly offset with respect to the lengthwise center of the slot 5a. Arranging the feed in that way helps to increase the coupling between the slot 5a and the feed antenna 11. It may be noted that the position of the feed antenna 11 with respect to the center of the slot 5a determines the impedance of the slot antenna 5a. The slot impedance should be matched to the feed impedance. The impedance is high at the center of the slot 5a and zero at the end of the slot 5a.

In the illustrated example, the circuit board 9 is attached to the driver board 7. A communication unit 10, for example a radio frequency transceiver, is mounted on the circuit board 9. The communication unit 10 is configured for wireless communication between the lighting device 1 and an external device (not shown). The communication unit 10 is also configured to control the SSL element 3 based on wireless signals sent to the communication 10 from the external device. In a different example, a unit other than the communication unit 10 may be controlling the SSL element 3.

The communication unit 10 is electrically connected to a feed antenna 11, henceforth referred to as the "antenna" for brevity, for feeding the slot 5a. The antenna 11 is thus arranged to excite the slot 5a electromagnetically so that the slot 5a resonates at a desired frequency. The antenna 11 is in this example a monopole whip antenna which is printed on the circuit board 9. The antenna 11 is thus arranged in a plane which is substantially perpendicular to the central axis A. The antenna 11 may be printed on both sides of the circuit board 9 or only one side of the circuit board 9. Alternatives to printed antennas include chip antennas, (solid) metal strip antennas and wire antennas.

A portion of the antenna 11, in this case the entire antenna 11, is curved. The antenna 11 is arranged along a curved inner side wall (5b) of the heat sink 5. The length of the antenna 11 is typically approximately $\lambda/4$, where $\lambda$, is the wavelength of the fundamental resonance of the slot 5a. The length of the antenna 11 is usually in the range from 19 mm to 22 mm. The inventors have found that the exact length of the antenna 11 is typically not a critical factor to achieve a strong coupling between the antenna 11 and the slot 5a. The position of the end tip 11a of the antenna 11, on the other hand, is an important factor. Specifically, the end tip 11a should be arranged at the slot 5a, i.e. in the vicinity of the slot 5a, in order to achieve a strong coupling and make the slot 5a resonate. In the illustrated example, the end tip 11a is situated in an imaginary circle sector S which, in a radial direction, extends from the central longitudinal axis A to the middle of the slot 5a and which has an arc length of 100%-125% of the width w of the slot 5a. Also, in the illustrated example, the antenna 11 and the slot 5a do not completely cross each other when viewed in a direction perpendicular to the central axis A (a radial direction in FIG. 3). Differently stated, the antenna 11 and the slot 5a do not completely overlap when viewed in a direction perpendicular to the central axis A. In the illustrated example, the antenna 11 is arranged so that there is no such overlap. It should be noted that, in a different example, the antenna 11 may be arranged so that there is a partial overlap (illustrated in FIG. 3 by the dotted lines) or so that there is a complete overlap (i.e. so that the antenna 11 and the slot 5a completely cross each other).

In use, power is supplied to the SSL element 3 via the connector 2 and circuitry on the driver board 7. The light emitted by the LEDs 3a leaves the lighting device 1 through the member 4 and illuminates the surroundings of the lighting device 1. Heat generated by the LEDs 3a is first transferred to the heat sink 5 which then gives off the heat to the ambient air, primarily through convection.

An external device such as a smartphone, a tablet PC or a dedicated remote control may be used to control the lighting device 1 by sending radiofrequency signals to the communication unit 10. The signals are first received by the slot 5a, operating as a slot antenna, and then transferred to the communication unit 10 via the antenna 11. The communication unit 10 processes the signal and controls the driver 7 and the SSL element 3 in accordance with the received signal. Depending on the application, it may be possible to for example switch the lighting device 1 on and off, to dim the lighting device 1 and/or to change the color settings of the lighting device 1. The lighting device 1 may be configured to send a signal to the external device if, for example, the SSL element 3 malfunctions. The communication unit 10 then generates a signal which is transferred to the external device via the antenna 11 and the slot 5a.

In use, the antenna 11 and the slot 5a communicate via proximity coupling so as to enable wireless communication between the lighting device 1 and the external device. Specifically, during transmission of signals, the antenna 11 generates a strong time-varying electric field at its end tip. The generated electric field extends to a portion 9a of the circuit board 9 which operates a ground plane. The slot 5a is arranged sufficiently close to the end tip 11a for it to be influenced by the fringing fields generated by the antenna 11. The generated electric field is "copied" into the slot 5a by means of proximity coupling. The excited slot 5a starts to radiate electromagnetic waves corresponding to the fundamental resonance frequency of the slot 5a. The field distribution of the radiating slot 5a may be computed using by "antenna slot theory". The reception of signals is carried out analogously.

Figure 4:
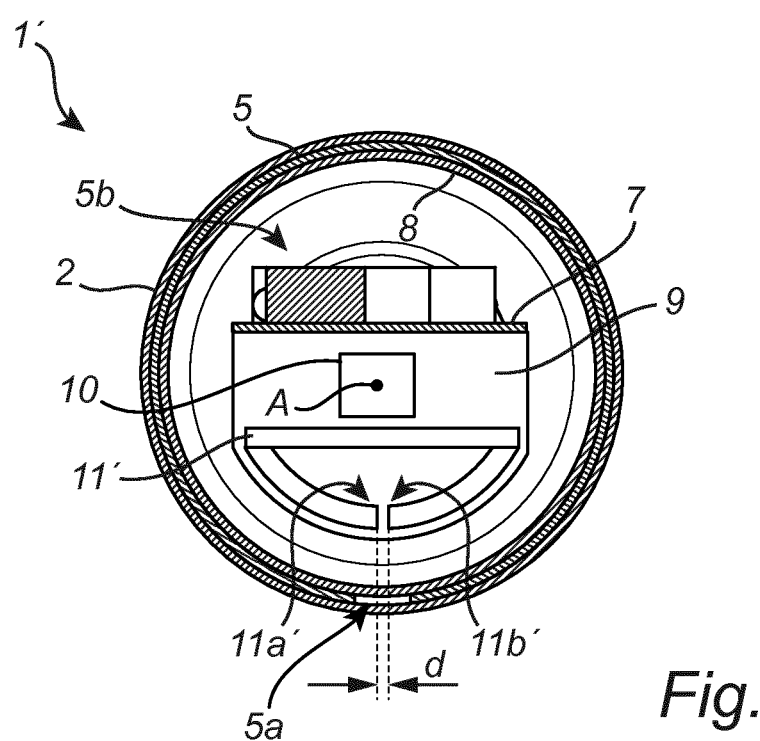
FIG. 4 shows a top view, similar to the one in FIG. 3, of a lighting device according to another embodiment of the invention.

FIG. 4 shows a lighting device 1' which is similar to the one showed in FIGS. 1 to 3 except in that the antenna 11' is a dipole antenna. The antenna 11' has two curved portions, each having an end tip 11a', 11b'. The two end tips 11a', 11b' have different electric polarity when the antenna 11' is in operation. The two end tips 11a', 11b' are located at the slot 5a, a gap separating the two end tips 11a, 11b from each other being approximately aligned with the slot 5a. The distance d between the end tips 11a', 11b' depends on the application, a typical distance d being approximately 1.4 mm.

The person skilled in the art realizes that the present invention by no means is limited to the preferred embodiments described above. On the contrary, many modifications and variations are possible within the scope of the appended claims. For example, the slot 5a may have a straight shape, a T-shape or a zigzag shape. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device comprising:
    a communication unit for wireless communication between the lighting device and an external device;
    a solid-state lighting element electrically connected to the communication unit;
    a heat sink in thermal contact with the solid-state lighting element, the heat sink having a slot adapted to act as a slot antenna; and
    a feed antenna electrically connected to the communication unit, the feed antenna having at least one end tip arranged at the slot so as to enable the feed antenna and the slot to communicate by proximity coupling, and,
    wherein the feed antenna is a dipole antenna having two end tips located at the slot, and the slot is aligned with a gap between the two end tips.

2. The lighting device according to claim 1, wherein the heat sink is cylindrical.

3. The lighting device according to claim 1, wherein at least a portion of the feed antenna is curved and includes the at least one end tip.

4. The lighting device according to claim 2, wherein said portion of the feed antenna is arranged along a curved inner side wall of the cylindrical heat sink.

5. The lighting device according to claim 4, wherein the at least one end tip is situated in an imaginary sector defined by a central longitudinal axis of the cylindrical heat sink extending from the axis to the middle of the slot and 100%-125% of the width of the slot.

6. The lighting device according to claim 3, wherein said portion of the feed antenna does not cross the slot.

7. The lighting device according to claim 1, further comprising a circuit board.

8. The lighting device according to claim 7, wherein the feed antenna is printed on two opposite sides of the circuit board.

9. The lighting device according to claim 7, wherein the circuit board comprises a ground plane, and wherein the slot is aligned with a gap between the end tip of the feed antenna and the ground plane.

10. The lighting device according to claim 1, wherein the complete slot is provided in a curved side wall of the cylindrical heat sink.

11. The lighting device according to claim 1, wherein the slot is L-shaped.

12. The lighting device according to claim 11, further comprising a connector for mechanically and electrically connecting the lighting device to a light socket, wherein a bottom of the L-shaped slot is proximal to the connector.

* * * * *